(12) United States Patent
Grindstaff, II et al.

(10) Patent No.: US 12,160,479 B2
(45) Date of Patent: Dec. 3, 2024

(54) CYBERSECURITY MATURITY ASSESSMENT

(71) Applicant: CMMI Institute, LLC, Pittsburgh, PA (US)

(72) Inventors: Edward Douglas Grindstaff, II, Nashville, TN (US); Matthew Stuart Loeb, Barrington, IL (US); Kelly Hood, Columbia, MD (US); Greg Witte, Churchton, MD (US); Thomas Conkle, Pasadena, MD (US)

(73) Assignee: CMMI Institute, LLC, Pittsburgh, PA (US)

( * ) Notice: Subject to any disclaimer, the term of this patent is extended or adjusted under 35 U.S.C. 154(b) by 0 days.

(21) Appl. No.: 18/312,546

(22) Filed: May 4, 2023

(65) Prior Publication Data

US 2023/0275967 A1 Aug. 31, 2023

Related U.S. Application Data

(63) Continuation of application No. 17/896,595, filed on Aug. 26, 2022, now Pat. No. 11,659,048, which is a
(Continued)

(51) Int. Cl.
*H04L 67/303* (2022.01)
*G06F 9/451* (2018.01)
(Continued)

(52) U.S. Cl.
CPC .......... *H04L 67/303* (2013.01); *G06F 9/451* (2018.02); *G06F 9/542* (2013.01);
(Continued)

(58) Field of Classification Search
CPC ....... H04L 67/303; H04L 67/30; G06F 9/451; G06F 18/2415; G06F 9/542; G06F 21/577; G06F 2221/034
See application file for complete search history.

(56) References Cited

U.S. PATENT DOCUMENTS 5,765,138 A * 6/1998 Aycock .................. G06Q 30/06
705/7.41
10,387,393 B1 * 8/2019 Abraham ............... G06Q 10/10
(Continued)

OTHER PUBLICATIONS

Cybersecurity Maturity Assessment, U.S. Appl. No. 16/226,117, filed Dec. 19, 2018, Edward Grindstaff, et al. Patented Case, Aug. 10, 2022.
(Continued)

*Primary Examiner* — David E Choi
(74) *Attorney, Agent, or Firm* — Greenberg Traurig

(57) ABSTRACT

Systems and methods directed to computing a maturity measurement for a computer system. Examples can include generating and outputting to an I/O device, a user interface including a plurality of user input fields for receiving the likelihood and/or impact of a plurality of pre-defined potential events related to a plurality of pre-defined potential vulnerabilities related to a computer system. Examples can also include receiving, via the user interface, a risk profile including the likelihood and/or impact for each event of a selected group of events of the plurality of pre-defined potential events. Examples can also include computing a maturity measurement for the computer system using the risk profile and a database. The database can include information for a set of practices and relationships between practices the set of practices and events of the plurality of pre-defined potential events.

18 Claims, 12 Drawing Sheets

Related U.S. Application Data continuation of application No. 16/226,117, filed on Dec. 19, 2018, now Pat. No. 11,429,726.

(60) Provisional application No. 62/620,979, filed on Jan. 23, 2018.

(51) Int. Cl.
*G06F 9/54* (2006.01)
*G06F 18/2415* (2023.01)
*G06F 21/57* (2013.01)
*H04L 67/30* (2022.01)

(52) U.S. Cl.
CPC ........ *G06F 18/2415* (2023.01); *G06F 21/577* (2013.01); *H04L 67/30* (2013.01); *G06F 2221/034* (2013.01)

(56) References Cited

U.S. PATENT DOCUMENTS

| | | | |
|---|---|---|---|
| 10,542,148 B1* | 1/2020 | Merritt | G06Q 10/0635 |
| 10,846,051 B1* | 11/2020 | Chatzipanagiotis | G06F 7/023 |
| 11,056,223 B1 | 7/2021 | Ahmad | |
| 11,429,726 B2 | 8/2022 | Grindstaff, II et al. | |
| 11,659,048 B2 | 5/2023 | Grindstaff, II et al. | |
| 2005/0234767 A1* | 10/2005 | Bolzman | G06Q 10/06393 |
| | | | 705/7.39 |
| 2010/0242114 A1 | 9/2010 | Bunker et al. | |
| 2014/0208429 A1 | 7/2014 | Stephenson | |
| 2016/0299771 A1 | 10/2016 | Navarro et al. | |
| 2018/0018602 A1* | 1/2018 | DiMaggio | G16H 10/60 |
| 2018/0270265 A1 | 9/2018 | Sage | |
| 2018/0322292 A1* | 11/2018 | Tedeschi | H04L 63/1433 |
| 2019/0020674 A1 | 1/2019 | Vervier et al. | |
| 2019/0180039 A1* | 6/2019 | Considine | G06F 21/6218 |
| 2019/0228161 A1 | 7/2019 | Grindstaff, II et al. | |
| 2019/0376143 A1 | 12/2019 | Malafa et al. | |
| 2020/0063215 A1 | 2/2020 | Permuth et al. | |
| 2021/0166322 A1* | 6/2021 | Allen | G06Q 40/08 |
| 2022/0414232 A1 | 12/2022 | Grindstaff, II et al. | |

OTHER PUBLICATIONS

Cybersecurity Maturity Assessment, U.S. Appl. No. 17/896,595, filed Aug. 26, 2022, Edward Grindstaff, II et al. Patented Case, May 3, 2023.

* cited by examiner

3. IDENTIFY AND MANAGE RISKS

| IMPLEMENT RISK IDENTIFICATION | ENSURE ACCESS CONTROL MANAGEMENT | ESTABLISH ORGANIZATIONAL TRAINING | ESTABLISH DATA SECURITY PROTECTION | — FUNCTIONAL AREA |
|---|---|---|---|---|
| | | | | — CAPABILITY AREAS |
| Asset Discovery & Identification | Manage Identities and Credentials | General User Training | Safeguard Data at Rest | — PRACTICE AREAS |
| Vulnerability Identification | Manage Access to Systems | Privileged User Training | Safeguard Data in Transit | |
| Supply Chain Risk Identification | Manage Access Permissions | 3rd Party Training | Manage Asset Lifecycle | |
| Identification of Roles & Responsibilities | Manage Network Integrity & Segregation | Senior Leader Training | Capacity Planning | |
| Information Classification Considerations | Manage Communications Protections | Physical Security Training | Integrity and Data Leak Preventions | |

| | General | People | Process | Technology |
|---|---|---|---|---|
| Level 1 (Performed) | Represents a minimum standard of care. Basic functions may be performed. These functions are performed informally and may not be prioritized commensurate with risk. | General personnel capabilities may be performed by an individual, but are not well defined | General process capabilities may be performed by an individual, but are not well defined | General technical mechanisms are in place and may be used by an individual |
| Level 2 (Managed) | Basic functions are achieved with relative consistency. Subset of the organization has developed plan, but formal organization strategy or documented plan has not been developed. | Personnel capabilities achieved consistently within subsets of the organization, but inconsistent across the entire organization | Adequate procedures documented within a subset of the organization | Technical mechanisms are formally identified and defined by a subset of the organization; technical requirements in place |
| Level 3 (Defined) | Formal plans and strategies define the consistent achievement of functions across the organization. Lagging indicators provide understanding of the work performed. | Roles and responsibilities are identified, assigned, and trained across the organization | Organizational policies and procedures are defined and standardized. Policies and procedures support the organizational strategy | Purpose and intent is defined (right technology, adequately deployed); Proper technology is implemented in each subset of the organization |
| Level 4 (Quantitatively Managed) | Achievement of outcomes is measured and reported. Leading indicators contribute to proactive risk management and continual improvement | Achievement and performance of personnel practices are predicted, measured, and evaluated | Policy compliance is measured and enforced. Procedures are monitored for effectiveness. | Effectiveness of technical mechanisms are predicted, measured, and evaluated |
| Level 5 (Optimized) | Mechanisms for outcome achievement are integrated into organizational activities | Proactive performance improvement and resourcing based on organizational changes and lessons learned (internal & external) | Policies and procedures are updated based on organizational changes and lessons learned (internal & external) are captured. | Technical mechanisms are proactively improved based on organizational changes and lessons learned (internal & external) |

Generating and outputting to an I/O device, a user interface including a plurality of user input fields for receiving the likelihood and/or impact of a plurality of pre-defined potential events related to a plurality of pre-defined potential vulnerabilities related to a computer system (e.g., generating a GUI including a matrix of the user input fields, wherein the matrix is defined by the set of pre-defined potential vulnerabilities and the set of pre-defined potential events such that each field in the matrix is defined by a unique risk scenario having one of the pre-defined potential vulnerabilities and one of the pre-defined potential events; and outputting the GUI to a display device of the I/O device)

902

---

Receiving, via the user interface, a risk profile including the likelihood and/or impact for each event of a selected group of events of the plurality of pre-defined potential events

904

---

Computing a maturity measurement for the computer system using the risk profile and a database, the database including information for a set of practices and relationships between practices the set of practices and events of the plurality of pre-defined potential events

Mapping certain practices of the set of practices to unique risk scenarios of the risk profile according to the relationships between practices the set of practices and events of the plurality of pre-defined potential events in the database
1102

↓

Associating each mapped practice of the mapped certain practices with a predefined maturity level in the database
1104

↓

Weighting each likelihood and/or impact for each event of the selected group of events with the predefined maturity level of the certain practice mapped to the event such that the maturity measurement is a weighted summation or a weighted average of likelihoods and/or impacts of the selected group of events
1106

↓

Performing a weighted summation or a weighted average of the likelihoods and/or impacts of the selected group of events to calculate the maturity measurement
1108

FIG. 11

CYBERSECURITY MATURITY ASSESSMENT

CROSS-REFERENCE TO RELATED APPLICATION

The present application is a continuation application of U.S. patent application Ser. No. 17/896,595 filed Aug. 26, 2022, issued as U.S. Pat. No. 11,659,048 on May 23, 2023, which is a continuation application of U.S. patent application Ser. No. 16/226,117 filed Dec. 19, 2018, issued as U.S. Pat. No. 11,429,726 on Aug. 30, 2022, which claims the benefit of priority from U.S. Provisional Patent Application No. 62/620,979, filed on Jan. 23, 2018, the entire contents of which applications are hereby incorporated herein by reference.

FIELD OF THE TECHNOLOGY

At least some embodiments disclosed herein relate to cybersecurity in general and more particularly, but not limited to, assessment of the cybersecurity maturity of a computer system and its improvement.

BACKGROUND

Assessment of cybersecurity capability and maturity of a computer system typically requires a team of experts with expertise in many areas of cybersecurity in general, as well as local knowledge about the computer system. Cybersecurity of a computer system is often assessed with respect to cybersecurity standards.

Cybersecurity standards are published techniques for protection of a cyber environment of a user or organization. The cyber environment can include end users, computer networks, related software, processes and systems within or external to the networks, and information in storage or transit. Cybersecurity standards can reduce the risks associated with computer systems, including management and prevention of attacks and security breaches. The standards can include collections of processes and protocols, policies, guidelines, security concepts and safeguards, risk management techniques, training, assurance and actual technologies.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed herein are technologies for evaluation of the maturity of a computer system in cybersecurity. Also, disclosed herein are technologies for generation of a corresponding roadmap for improving the computer system in cybersecurity.

Some embodiments can include a computer implemented method that includes generating and outputting to an I/O device, a user interface including a plurality of user input fields for receiving the likelihood and/or impact of a plurality of pre-defined potential events related to a plurality of pre-defined potential vulnerabilities related to a computer system. Such embodiments can include receiving, via the user interface, a risk profile including the likelihood and/or impact for each event of a selected group of events of the plurality of pre-defined potential events. Such embodiments can also include computing a maturity measurement for the computer system using the risk profile and a database. The database can include information for a set of practices and relationships between practices the set of practices and events of the plurality of pre-defined potential events.

Also, in such embodiments, the likelihood and/or impact for each event of the selected group of events can be a separate element of the risk profile. The receiving of the likelihood and/or impact for each event of the selected group of events can include receiving the likelihood and the impact for each event of the selected group of events. And, each field of the plurality of user input fields can defined by a unique risk scenario having one vulnerability of the plurality of pre-defined potential vulnerabilities and one event of the plurality of pre-defined potential events.

In embodiments where each field of the plurality of user input fields is defined by a unique risk scenario having one vulnerability of the plurality of pre-defined potential vulnerabilities and one event of the plurality of pre-defined potential events, the generating and outputting the user interface can include generating a graphical user interface (GUI) having a matrix of the user input fields (such as the risk matrix illustrated in FIG. 3). The matrix can be defined by the set of pre-defined potential vulnerabilities and the set of pre-defined potential events such that each field in the matrix is defined by a unique risk scenario having one of the pre-defined potential vulnerabilities and one of the pre-defined potential events. The outputting can include outputting the GUI with the matrix to a display device of the I/O device.

Each event of the selected group of events of the risk profile can be a unique risk scenario of one vulnerability of the plurality of pre-defined potential vulnerabilities. In such embodiments, the computing the maturity measurement for the computer system can include mapping certain practices of the set of practices to the unique risk scenarios of the risk profile according to the relationships between practices the set of practices and events of the plurality of pre-defined potential events in the database. Each mapped practice of the mapped certain practices can be associated with a predefined maturity level in the database. And, computing the maturity measurement for the computer system can be based on at least the predefined maturity levels of the mapped certain practices.

Also, the computing the maturity measurement for the computer system can include summing or averaging the predefined maturity levels of the mapped certain practices such that the maturity measurement includes a summation or average of the predefined maturity levels of the mapped certain practices. Additionally, or alternatively, the computing the maturity measurement for the computer system can include weighting each likelihood and/or impact for each event of the selected group of events with the predefined maturity level of the certain practice mapped to the event such that the maturity measurement is a weighted summation or a weighted average of likelihoods and/or impacts of the selected group of events.

The predefined maturity level for each practice of the set of practices can be one of five levels of maturity. The five levels of maturity can include an initial level of maturity (e.g., performed), a repeatable level of maturity (e.g., managed), a defined level of maturity (e.g., defined), a capable level of maturity (e.g., quantitatively managed), and an efficient level of maturity (e.g., optimized). The determining of a level of maturity for each practice of the set of practices can include determining whether the level of maturity is the performed level, which can include determining whether the practice is repeated but not documented. The determining of a level of maturity for each practice of the set of practices can also include determining whether the level of maturity is the managed level, which can include determining whether the practice is repeatable according to documentation. The determining of a level of maturity for each practice of the set of practices can also include determining whether the level of maturity is the defined level, which can include determining whether the practice is defined or confirmed as a standard process. The determining of a level of maturity for each practice of the set of practices can also include determining whether the level of maturity is the quantitatively managed level, which can include determining whether the practice is quantitatively managed in accordance with agreed-upon metrics. The determining of a level of maturity for each practice of the set of practices can also include determining whether the level of maturity is the optimized level, which can include determining whether process management of the practice includes systematic process improvement.

The computer system that is assessed by the computer implemented method can be a computing device or a computer network including at least a plurality of computing devices.

Some embodiments can include a non-transitory computer-readable storage medium having instructions that, when executed by a processing device, cause the processing device to: generate and output to an I/O device, a user interface including a plurality of user input fields for receiving the likelihood and/or impact of a plurality of pre-defined potential events related to a plurality of pre-defined potential vulnerabilities related to a computer system; receive, via the user interface, a risk profile including the likelihood and/or impact for each event of a selected group of events of the plurality of pre-defined potential events; and compute a maturity measurement for the computer system using the risk profile and a database. As mentioned, the database can include information for a set of practices and relationships between practices the set of practices and events of the plurality of pre-defined potential events.

Some embodiments can include a computer system, having a processing device, and memory in communication with the processing device. The memory can store instructions that, when executed by the processing device, cause the processing device to: generate and output to an I/O device, a user interface including a plurality of user input fields for receiving the likelihood and/or impact of a plurality of pre-defined potential events related to a plurality of pre-defined potential vulnerabilities related to a computer system; receive, via the user interface, a risk profile including the likelihood and/or impact for each event of a selected group of events of the plurality of pre-defined potential events; and compute a maturity measurement for the computer system using the risk profile and a database. As mentioned, the database can include information for a set of practices and relationships between practices the set of practices and events of the plurality of pre-defined potential events.

Both the foregoing summary and the following detailed description provide examples and are explanatory only. Accordingly, the foregoing summary and the following detailed description should not be considered to be restrictive. Further, features or variations can be provided in addition to those set forth herein.

BRIEF DESCRIPTION OF THE DRAWINGS

The embodiments are illustrated by way of example and not limitation in the figures of the accompanying drawings in which like references indicate similar elements.

FIG. 2 illustrates a Cybersecurity Capability Assessment (CCA) hierarchy, in accordance with some embodiments of the present disclosure.

FIG. 6 illustrates a practice area assessment, in accordance with some embodiments of the present disclosure.

FIG. 7 shows a table of maturity level definitions, in accordance with some embodiments of the present disclosure.

FIG. 9 is a flow diagram of a method, in accordance with some embodiments of the present disclosure.

FIG. 11 is a flow diagram of another method for computing a maturity measurement for a computer system, in accordance with some embodiments of the present disclosure.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 3:
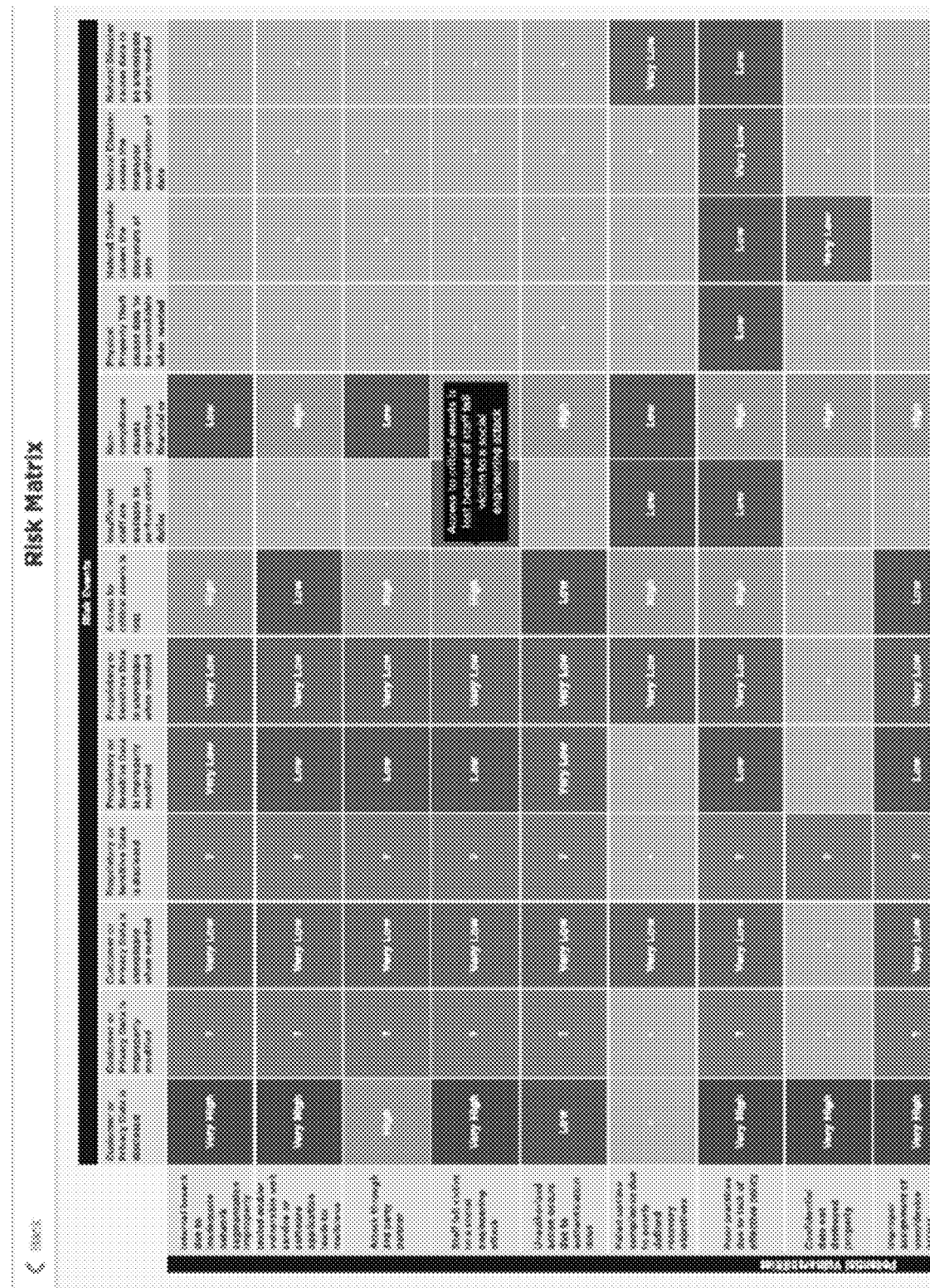
FIG. 3 illustrates a risk matrix, in accordance with some embodiments of the present disclosure.

In at least some embodiments, a computer program presents a user interface that shows a matrix of pre-defined potential vulnerabilities and pre-defined potential events (such as the risk matrix illustrated in FIG. 3). A representative of a computer system and/or company can use the user interface to provide an assessment of the likelihood and potential business impact of each valid combination of potential vulnerability and potential event (e.g., impact being very low, low, high, very high (and N/A)). The input data can represent the risk profile of the computer system and/or company (e.g., see the risk profile shown in FIG. 4).

The computer program can include a database for the computation of maturity measurement from the risk profile. Based on the risk profile, the maturity of the computer system and/or company can be evaluated as one of several levels, such as evaluated as one of the following levels: performed, managed, defined, quantitatively managed, and optimized. The evaluated level can be computed as a combined consideration of the maturity levels of people using the system, processes implemented in the system, and technologies of the system (such as devices and apparatuses of the system).

The computer program then can generate a report that identifies practices that do not meet targets. The identified practices can be grouped by capability. A graphical user interface (GUI) can show graphical representation of capability areas and practices areas, with gaps between target maturity and actual maturity and the numbers of practices in the groups.

The computer program then can generate a roadmap (such as the roadmap illustrated in FIG. 5) for improvement, with recommended practices prioritized according to risk level.

Within the computer program and/or database, each combination of the potential vulnerability and potential event can be defined as a set of collection of practices that has a predefined maturity level. The computer program can combine the likelihood and impact from the risk profile and the predefined maturity level to generate a score for the practice. The scores of practices in a group can be combined for the group. The scores for groups can be combined for the system and/or company. The scores of the groups can be sorted to identify practices that are not in place and prioritize the roadmap.

The computer program can provide many assessments, reports, tools, and the like. For example, the computer program can provide a multi-site capability in which a user can assess multi-sites using the same risk profile. This can enable the user to complete comprehensive assessments of different sites, compare those sites maturity and roll-up into a single roadmap for prioritization (e.g., see the roadmap illustrated in FIG. 5). The computer program can provide project management tools for enable the user to easily assign different elements of the assessment to assessors with expertise in a given area. The computer program can provide project management tools to easily track progress of the assessment against a targeted timeframe and ensure that all assessors are on-track. The computer program can also provide benchmarking capability which companies can use to see how their maturity compares to other computer systems of other organizations with similar characteristics, where the data of other organizations are anonymized. The computer program can be used as a self-assessment for a system and/or company. However, consultants can also use the computer program to deliver the assessment as well. The computer program can provide a supply chain assessment, where the risk profile is used to provide maturity targets to suppliers such that an organization can request their supply chain to align with the organization's risk profile. Security profile data, such as maturity by capability area in a specific industry, risk profile for a specific industry, etc., can be used to facilitate industry research, such as research used by anyone of the techniques described herein.

In some embodiments, the computer program uses the risk matrix (such as the risk matrix illustrated in FIG. 3) to map predefined risk scenarios to practices that help mitigate the risk identified. For example, a computer database can store a row of data identifying a practice of "Procedures are standardized across the organization to align with the information classification policy". This practice can be assigned a practice ID of "RI.CC-27" and a maturity level of "L3". This practice is pre-associated with a list of potential vulnerabilities of "PV-1, PV-7, PV-8, PV-9, PV-11" and a list of risk scenarios of "PV-1 (C,I,A,LA,NC):H, PV-7 (C,I,A,NC):H, PV-8 (C, NC):H, PV-9 (C,I,A,LA,NC):H, PV-11 (C,I,A, LA,NC):H". For example, a potential vulnerability (PV-1) represents "inadequate network segmentation". Consequence identifiers I, A, LA, NC represent risks in confidentiality (C), integrity (I), availability (A), loss of access (LA), and non-compliance (NC). Risk level identifies are very low (VL), low (L), high (H), very high (VH). Thus, PV-1 (C, I, A, LA, NC):H) represents a set of risk scenarios where "inadequate network segmentation" causing risks of (e.g., effect of the vulnerability on) confidentiality (C), integrity (I), availability (A), loss of access (LA), and/or non-compliance (NC) are high (H).

Also, for example, if a user inputs that disclosure of customer information (RE-1: customer data, confidentiality) through and internal breach due to a potential vulnerability of "inadequate network segmentation" (PV-1) was a high security risk (high likelihood and high impact) then the risk scenarios of PV-1 (C, I, A, LA, NC):H defined for the practice RI.CC-27 causes the practice RI.CC-27 to be recommended.

Figure 4:
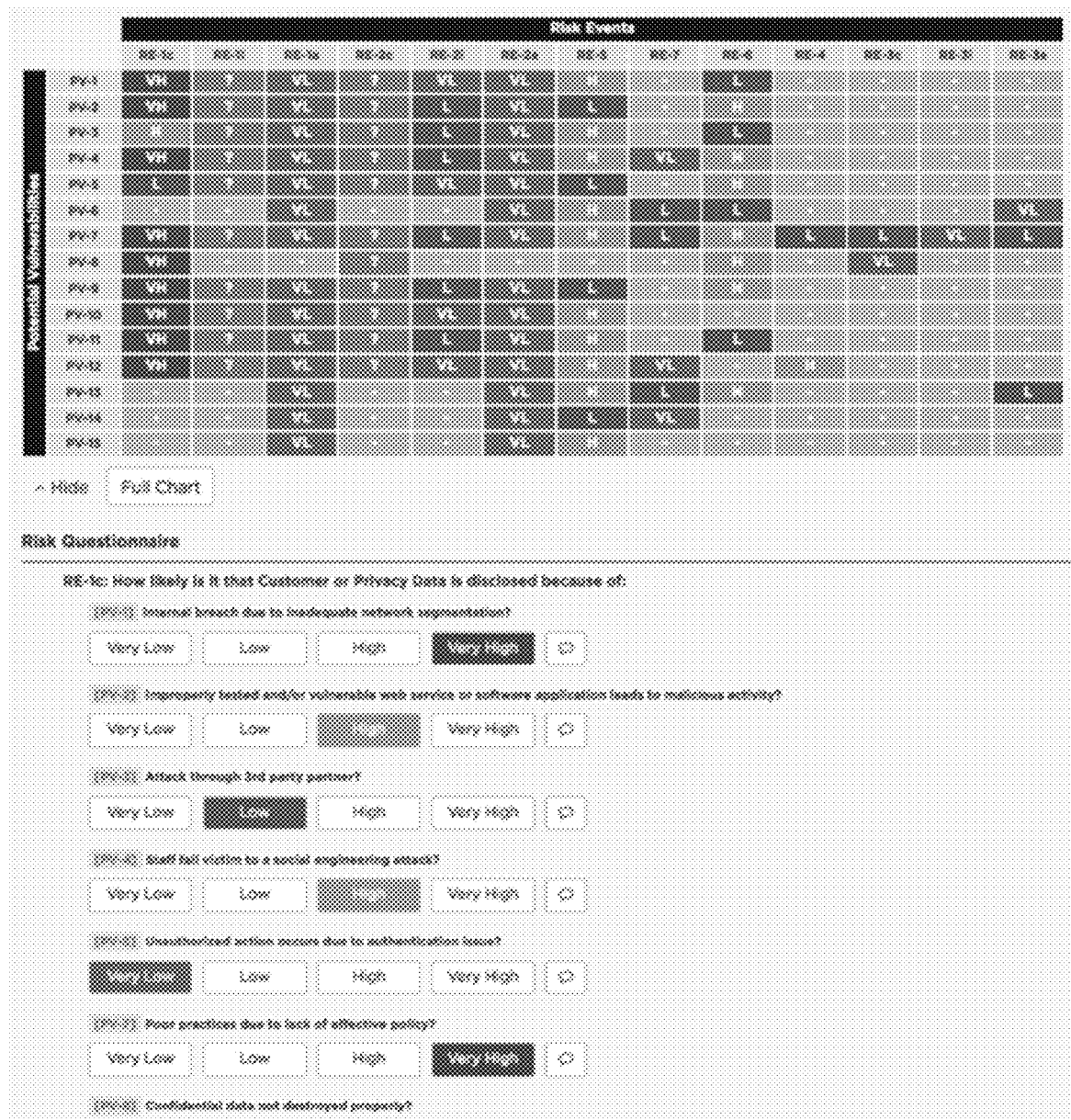
FIG. 4 illustrates a risk profile and questionnaire, in accordance with some embodiments of the present disclosure.

Using a table of the rows identifying the maturity level of a practice and the risk scenarios that recommends the practice, the computer can evaluate and/or recommend a practice based on the data collected via the user interface for the risk profile and questionnaire (such as the risk profile and questionnaire illustrated in FIG. 4).

The computer program can directly link risks to practices that are also aligned to maturity level. This can help users understand what is necessary based on the business risk imposed by the risk scenario. A collection of such associated or linked practices, in the form of a security catalogue, for example, can be provided by the computer program.

In the example mentioned above, practice RI.CC-27 aligns to more than twenty different risk scenarios. Most practices align to more than one risk scenario; however, each alignment is different depending on the user's risk thresholds for various risk scenarios.

As illustrated in FIG. 4, the impacts of vulnerabilities (e.g., "very low", "low", "high", "very high", or "not apply") can defined via a user interface and/or questionnaire. The definitions for impact and likelihood are defined in the model and can be unique.

In some embodiments, if the user does not select a practice in the corresponding field or mark that field as not applicable it is considered not in place by a tool of the computer program. The 'threshold' or target maturity can be assigned based on the user defined risk levels from completing the risk profile. Because the risk scenarios are mapped to the practices as mentioned above, the target maturity level can be determined by identifying the highest level of maturity aligned to all practices selected based on the user identified risks.

The computer program can directly link security risks (e.g., risk scenarios) to corresponding activities, align industry standards for maturity to cybersecurity activities, present practices (e.g., cybersecurity activities) written in layperson terms enabling IT operators to complete the self-assessment, determine relationship between a practice and specific risk scenarios that are mitigated by the practice, determine the risk level at which the practice should be included in the roadmap, and provide anonymized cybersecurity benchmark data to industry peers.

Figure 5:
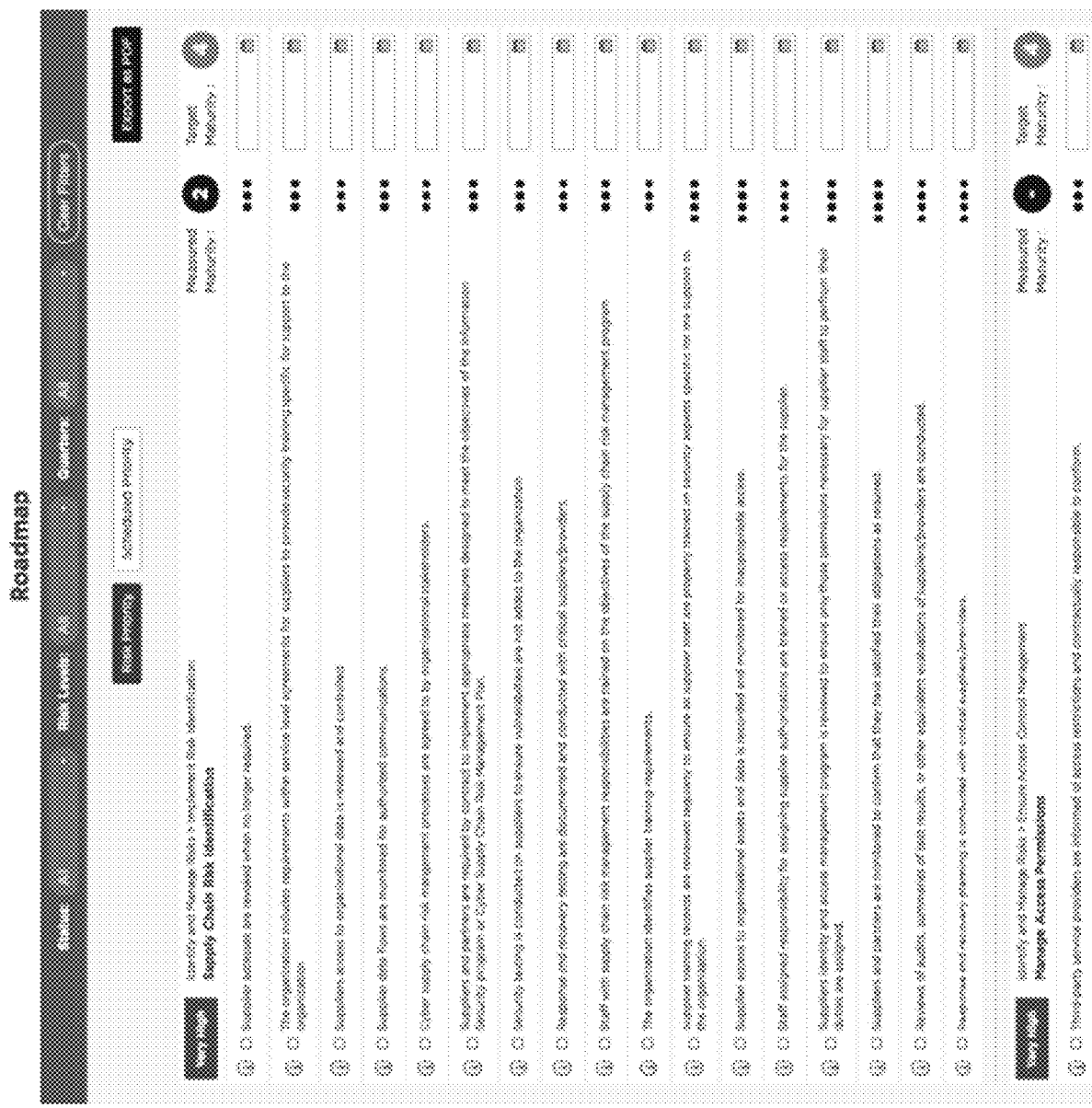
FIG. 5 illustrates a roadmap generated by a computing device, in accordance with some embodiments of the present disclosure.

The computer program can create a roadmap and present executive dashboards simply from answered risk questions and identifying activities associated with the answers (e.g., see the roadmap illustrated in FIG. 5).

The computer program can associate a practice with a maturity level and/or with known risks.

Figure 1:
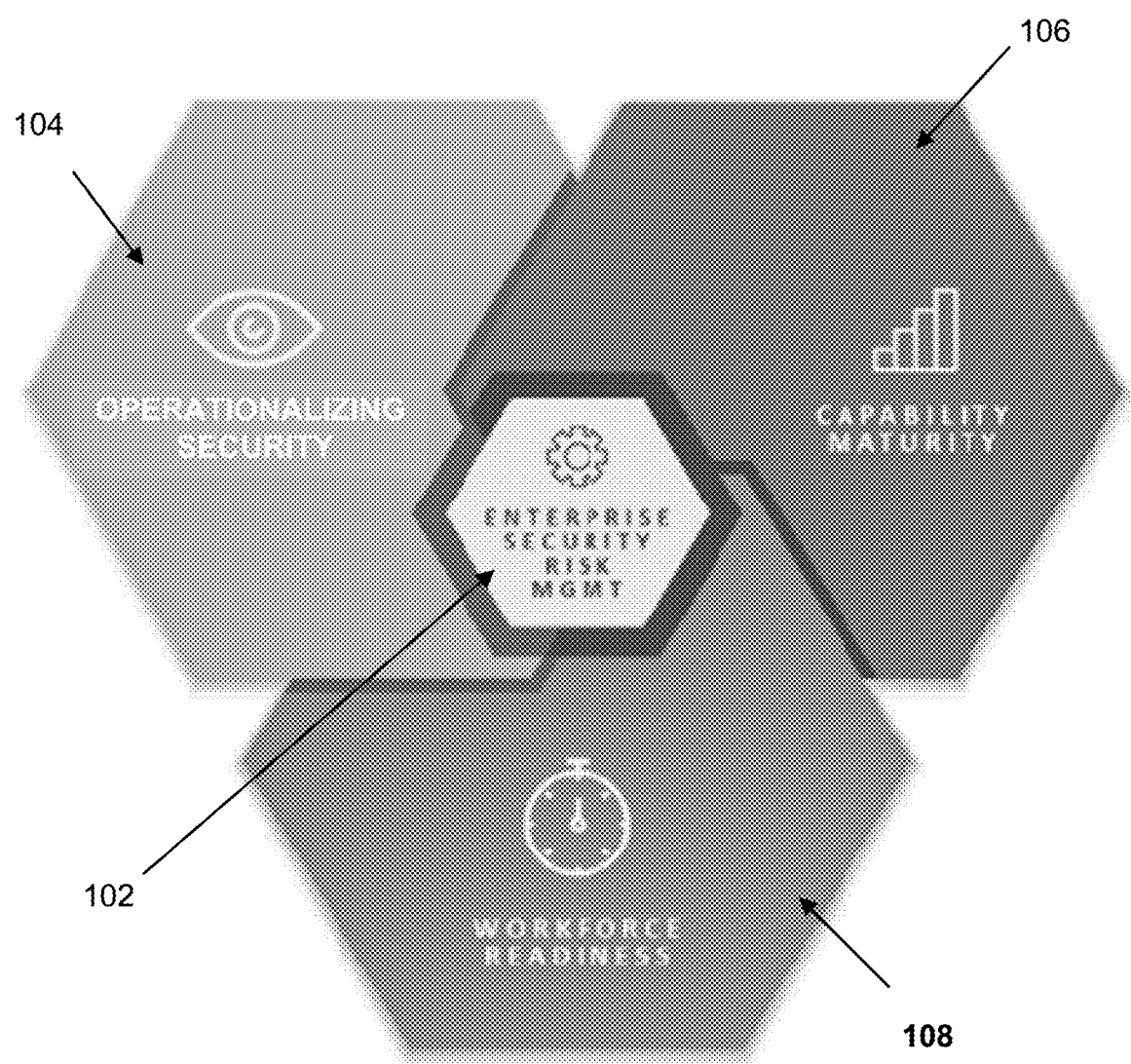
FIG. 1 shows an approach for building cybersecurity resilience, in accordance with some embodiments of the present disclosure.

Some embodiments can include a cybersecurity capability assessment (CCA) that is implemented by at least computer software and/or computer hardware and that is a risk-based, capability driven, approach to building a resilient cybersecurity program. A core part in the CCA for building cybersecurity resilience in an organization or computer system is the management of enterprise security risks, as shown in FIG. 1 at core component 102. Managing these risks can involve other components of the CCA including operationalizing security component 104, understanding the maturity of enterprise capabilities component 106, and ensuring the workforce is prepared to handle a security incident component 108. Such components can allow organizations to evaluate and build resilient cybersecurity programs for their computer systems.

To assist organizations in building an effective and resilient cybersecurity program, the CCA can include a self-assessment that focuses on identifying enterprise risk, setting standardized maturity targets, aligning risk to those maturity targets within capabilities areas, and prioritizing a roadmap to building organizational and computer system resilience (e.g., see the roadmap illustrated in FIG. 5).

Many organizations focus on compliance-based risk reduction before evaluating actual risks in the operational environment. Performing compliance-based risk reduction before the evaluation of actual risks can be misleading and lead to inefficient use of resources. The approach of the self-assessment is to drive resilience through the reduction of enterprise risks. Accordingly, the CCA can identify enterprise risks and priorities before attempting to comply with regulations and requirements. This can ensure that when regulatory requirements are implemented, the highest priority practices based on the highest risk capabilities can be implemented first.

Many organizations begin implementing cybersecurity controls out of fear of an incident or as a reaction to an incident. Often, controls that are implemented address the effect of an incident without considering the cause. Due to organizations and computer systems having different threats and vulnerabilities, calculating enterprise risk can become a complex task. The CCA can leverage standard industry risk approaches including the NIST SP 800 30 framework, Operationally Critical Threat, Asset, and Vulnerability Evaluation (OCTAVE) security framework, and Factor Analysis of Information Risk (FAIR) to create a risk profile providing a characterization of an organization's or computer system's risk.

The CCA can begin each assessment by evaluating the enterprise risks that could lead to an incident by asking organizations to consider the likelihood and impact of potential vulnerabilities and potential events to their organization or computer systems. By calculating enterprise risk through risk scenarios informed by the potential vulnerabilities and potential events, the CCA is able to identify and provide a characterization of an organization's or computer system's highest risks.

Security risk assessments can be a critical phase of defining an appropriate security program. However, many organizations are unable to complete a full risk assessment due to the lack of qualitative information, lack of time, or lack of experience in completing a risk assessment. The CCA can assist organizations by taking concepts from standard, and widely accepted, risk assessment processes. These concepts are then integrated and summarized to develop a risk profile within the CCA (e.g., see the risk questionnaire and risk profile depicted in FIG. 4). The risk profile can allow organizations to better understand the risk to their business as well as identify risk thresholds that can be used to set goals to inform objectives for their security program.

The risk profile is informed by potential vulnerabilities (such the fifteen potential vulnerabilities listed herein) and potential events (such as the thirteen potential events listed herein). In the case of the fifteen potential vulnerabilities and the thirteen potential events, a combination of the two factors can result in one hundred and eleven unique risk scenarios. While there could be thousands of potential vulnerabilities alone, the CCA takes the approach of characterizing vulnerabilities and risks to create a manageable risk profile with a balanced approach for identifying risk.

Fifteen potential vulnerabilities selected for some examples of the CCA can be PV-1, PV-2, PV-3, PV-4, PV-5, PV-6, PV-7, PV-8, PV-9, PV-10, PV-11, PV-12, PV-13, PV-14, and PV-15. In some embodiments, PV-1 can include an internal breach due to inadequate network segmentation. PV-2 can include an improperly tested and/or vulnerable web service or software application leads to malicious activity and/or malicious code. PV-3 can include an attack through 3rd party partner. PV-4 can include a staff fall victim to a social engineering attack. PV-5 can include unauthorized action occurs due to authentication issue. PV-6 can include failed uptime compliance due to poorly defined recovery objectives. PV-7 can include poor practices due to lack of effective policy. PV-8 can include confidential data not destroyed properly. PV-9 can include an improper assignment of user/device access permissions. PV-10 can include an unauthorized physical access to restricted location (Consider: "Abuse of physical access"). PV-11 can include improper configuration of required services or applications. PV-12 can include someone intentionally or unintentionally performs some other type of harmful action. PV-13 can include being unable to effectively recover from a significant event due to a response planning failure. PV-14 can include system or staff unavailability due to capacity issue. PV-15 can include a system or device hardware failure.

Thirteen potential events selected for some examples of the CCA can be RE-1c, RE-1i, RE-1 a, RE-2c, RE-2i, RE-2a, RE-3c, RE-3i, RE-3a, RE-4, RE-5, RE-6, and RE-7. These can include example cybersecurity events that can pose a direct threat to business operations and critical assets. Potential events define what could happen to resources (e.g. what could happen to assets, data, people, etc.) if a potential vulnerability is exploited by a threat actor. RE-1c relates to customer and/or privacy data (CD) and can include loss of confidentiality. RE-1i relates to customer and/or privacy data (CD) and can include loss of integrity. RE-1 a relates to customer and/or privacy data (CD) and can include loss of availability. RE-2c relates to proprietary and/or sensitive data (PD) and can include loss of confidentiality. RE-2i relates to proprietary and/or sensitive data (PD) and can include loss of integrity. RE-2a relates to proprietary and/or sensitive data (PD) and can include loss of availability. RE-3c relates to natural disaster (ND) and can include loss of confidentiality. RE-3i relates to natural disaster (ND) and can include loss of integrity. RE-3a relates to natural disaster (ND) and can include loss of availability. RE-4 relates to physical property theft (PT) and can include loss of availability. RE-5 can include loss of access to critical asset(s) (LA). RE-6 can include significant financial and/or operational impact of non-compliance (NC). RE-7 can include insufficient staff are available to perform critical duties (IS).

The risk profile is developed based upon the intersection of a potential vulnerability and a potential event resulting in a risk scenario which describes an actual incident that could compromise the security of an organization or a computer system (such as a computer device or a computer network).

The risk profile can be completed by answering a series of questions (such as one hundred and twenty-four questions (124 questions)). Some of the questions (such as one hundred and eleven questions (111 questions)) can focus on determining the likelihood of each potential vulnerability leading to applicable one or more potential events. Some other questions (such as the remaining thirteen (13) questions of the 124 questions) can be used to determine the impact the potential events on an organization, and/or a computer system if a potential vulnerability occurs.

The likelihood and impact of each risk scenario can be characterized on a four-point scale (very low, low, high, very high). While risk models can include either a three or five level scale or another scale. It is more optimal that the CCA uses a four-point scale. The middle level on many three and five-point scales is 'moderate' which allows an organization or computer system to stick to the middle resulting in all risks being at the same level. For the purposes identifying relative risk, the CCA can be implemented so that it does not allow a moderate option which forces organizations to choose from very low, low, high, or very high risk.

In some embodiments, after completing the questions (such as after completing the 124 questions) by assigning likelihood and impacts to the risk scenarios, each scenario's risk level can be calculated based upon a risk level definition table such as a table including the different risk levels. Using the selected likelihood and impact values, the CCA can determine the security risk to the organization or computer system in the case that the risk scenario is realized. The below Table 1 is an example of a risk level definition table.

TABLE 1

Risk Level Definition

| | Impact Very Low | Impact Low | Impact High | Impact Very High |
|---|---|---|---|---|
| Likelihood Very High | Very Low | Low | High | Very High |
| Likelihood High | Very Low | Low | High | Very High |
| Likelihood Low | Very Low | Low | High | High |
| Likelihood Very Low | Very Low | Very Low | Low | Low |

Once the risk profile has been completed, risk scenarios can be ranked based on risk levels to allow organizations to identify the highest risk scenarios and understand which potential vulnerabilities and potential events pose the largest risk to their organization or computer system.

Due to the many different inputs possible in the risk profile (such as 496 inputs in the illustrated example risk profile), each organization that completes the risk profile will be able to create a profile that is unique to their computer system. By taking the output of this unique risk profile, the ranked risk scenarios can be prioritized within the CCA to enable organizations to understand their highest risks and to make risk-informed decision regarding their security program. By providing this customized risk profile, organizations are able to prioritize their actions based on their highest risk areas.

Each of the risk scenarios (such as the 111 risk scenarios used in the illustrated example) are mapped to individual practices at specific maturity levels ranging from one to five. Using these mappings, the CCA is able to calculate a target organizational maturity level based upon the risk profile.

As organizations implement cybersecurity capabilities, it is important that there is a clear understanding of what functionality is being implemented as well as how the functionality is being executed by staff and integrated into the organization or computer system. Through the measurement of cybersecurity capabilities, organizations gain an understanding of the robustness of their security capabilities allowing them to evaluate whether their current cybersecurity maturity is appropriate for their business and the risks in their environment. Having a clear understanding of this relationship highlights unmitigated risk and enables organizations to make informed decision regarding the resources needed to mitigate risk and build cybersecurity resilience.

To effectively build cybersecurity resilience, organizations can focus on the people that work for and interact with the company, the policies and procedures in place to direct employees and partners, as well as the technical solutions used to keep their computer systems (such as computing devices and networks) running. The CCA can use a five-level maturity scale and redefine each level for cybersecurity capabilities. The maturity levels can establish expected outcomes at each of the maturity levels, such as each of the five maturity levels discussed herein: performed, managed, defined, quantitatively managed, and optimized. To ensure organizations focus on cybersecurity factors, the CCA can generate a table, such as a database table for each of security levels with respect to the level in general, people, processes, and technologies as show in FIG. 7.

Practices can be single outcome statements that build the security capabilities defined within the CCA. Many requirements and regulations are in place across industries, but very few align to enterprise risk and measure capability maturity. Each individual Practice in the CCA can be aligned and tagged to relevant security standards, risk scenarios, maturity levels, and capabilities to ensure that organizations get a comprehensive understanding of the capabilities their organization or computer system should be targeting.

In some embodiments, the architecture of the CCA is composed of a hierarchy of functional areas, capability areas, practice areas, and practices. Each practice aligns to a practice area defining a specific cybersecurity resilience topic. Each practice area aligns to a capability area describing a collection of practice areas aimed at achieving the same cybersecurity objective. An assessment can be done on the practice areas implemented by an organization or computer system (e.g., see the practice area assessment illustrated in FIG. 6). The highest level in the architecture is the functional area which is composed of a collection of capability areas. Each functional area describes a high-level capability required for an effective cybersecurity program. This hierarchy can be seen in FIG. 2. FIG. 2 depicts one of the seven functional areas in the CCA, to identify and manage risk.

In some embodiments, the CCA model can include many practice outcomes (such as over three thousand practice outcomes) that are divided among practice areas (such as eighty practice areas), aligned to capability areas (such as twenty-one capability areas), under seven functional areas (such as seven functional areas). In the case of seven functional areas, five of the seven functional areas can reflect a lifecycle approach to cybersecurity by achieving the following functions: identify and manage risks, ensure risk mitigation, ensure risk detection, ensure risk response, and ensure resilience. The two remaining functional areas in such an example, ensure governance framework and apply risk management are strategic functions necessary for building resilience. The outcomes of the ensure governance framework and apply risk management function areas inform the other functional areas to enable an effective cybersecurity program.

In some embodiment, the self-assessment of the CCA can include the practices that make up the security capabilities. Practices can be discrete statements describing an action that is taken by an organization for its computer systems. Practices can be selected by organizations during the self-assessment to indicate completion and identify the current state of a security program. The CCA then can use the output from the risk profile and the unselected practices to create a prioritized roadmap of action items for organizations or computer systems to use to build cybersecurity resilience (e.g., see the roadmap illustrated in FIG. 5).

Figure 6:
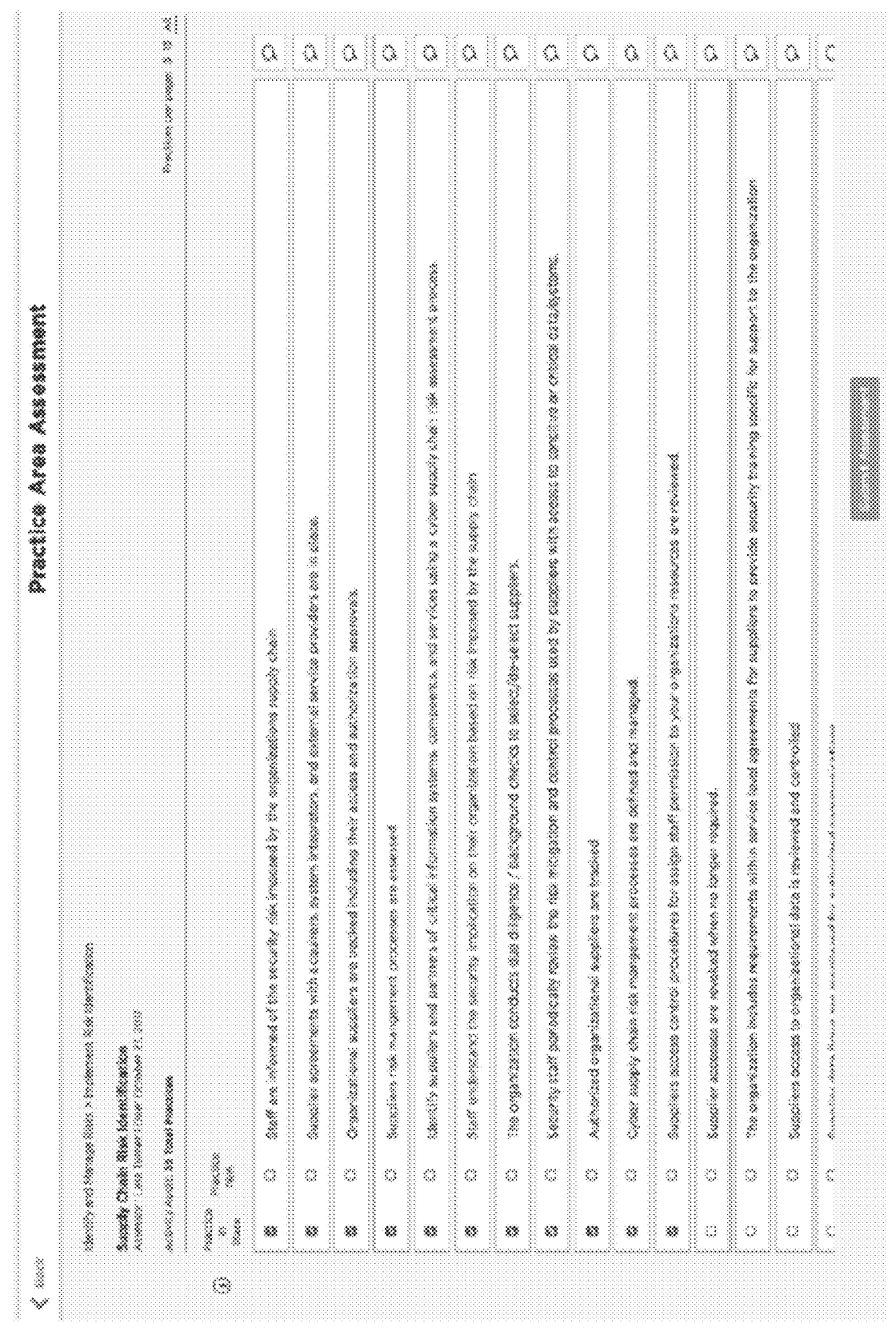

FIG. 6 illustrates a practice area assessment screen of the computer program. Practices can be statements understandable by IT professionals with little to no computer security experience. They can be generated as discrete, single outcome statements that an individual must be able to answer as either 'true' or 'false' when considering if an organization or a computer system has the practice in place. A collection of practices within a given practice area comprehensively describe how to effectively implement that practice area. An organization's or computer system's maturity level for each practice area can be defined by evaluating the highest maturity level at which all practices are marked as implemented.

Each practice can be aligned to selected industry standards, organizational security risk, maturity levels, and a threat kill cycle. This can create relationships between industry standards and the maturity levels, which allows the CCA to not only inform an organization of the types of controls that need to be in place, but how advanced and well implemented these controls should be in order to mitigate the risks to their environment. Some of these industry standards used can include the NIST Framework for Improving Critical Infrastructure Cybersecurity (The Cybersecurity Framework or CSF), ISO/IEC 27001 (Information technology—Security techniques—Information security management systems—Requirements), and ISO/IEC 27002 (Information technology—Security techniques—Code of practice for information security controls). Other standards used can include NIST SP 800-53 Security and Privacy Controls for Federal Information Systems and Organizations the CIS Top 20 Critical Security Controls, and the COBIT 5: A Business Framework for the Governance and Management of Enterprise IT. In addition to the aforesaid industry standards, practices can be provided with a topic tag to indicate whether the practice supports people, process, or technology aspects within the cybersecurity program of the computer system. Providing this tag highlights the importance of focusing on all three topics when building cybersecurity resilience.

Practices can also be tagged to the risk profile aligning potential events with potential vulnerabilities to create risk scenarios. Each tagged risk scenario is assigned a risk level of very low, low, high, or very high based on the level required to mitigate potential vulnerabilities and potential events.

Another alignment selected for the CCA is the use of the threat kill cycle (TKC). The TKC leverages industry standards as well as previous experience monitoring how threat actors progress their attacks. Practices within the CCA model are mapped to the appropriate cycle steps of the TKC. The TKC includes cycle steps reconnaissance prep (RE), delivery (DE), exploitation (EX), command and control (C2), internal reconnaissance (IR), lateral movement (LM), persistence (PE), and action (A). Reconnaissance Prep (RE) is associated with practices that assist in identifying sensitive information and ensuring it is protected from public access. Sensitive information can include benign information that when paired with other benign information provides sensitive details regarding the organization (e.g., company size, company affiliations, etc.). Delivery (DE) is associated with practices that prevent the delivery and implementation of malware. (Execution on initial victim). Exploitation (EX) is associated with practices that prevent the execution of malicious or otherwise unauthorized software. (Execution beyond initial victim). Command and Control (C2) is associated with practices that identify communication channels and system process that provide command and control access to the attacker. Internal reconnaissance (IR) is associated with practices that include the identification and prevention of unauthorized data connections, transfers, or modification. Lateral Movement (LM) is associated with practices that provides parathion within operating environments and detect unauthorized communications within the network. Persistence (PE) is associated with practices that detect and protect unauthorized services and process from executing. Action (A) is associated with practices that assist in the detection and protections of malicious activities including data exfiltration, data manipulation, and installation of additional malware (e.g. backdoors).

The CCA can tag the reference points of the TKC to strengthen the model used by the CCA providing organizations the ability to report alignment to multiple standards through one evaluation.

Using the risk-based maturity targets identified through the completion of the risk profile and the practice to maturity level alignments, the CCA can identify a roadmap of practices to achieve an organization's or computer system's target maturity (e.g., see the roadmap illustrated in FIG. 5). By gathering input on organizational or system risks, capabilities, and maturity, the CCA can provide a risk-informed prioritized list tailored directly from the risk profile. This tailored and prioritized roadmap empowers organizations to build cybersecurity resilience within their organization and their computer systems based on the missing activities required to meet their specific identified enterprise risk.

With the information provided by organizations in the risk profile, the CCA can identify target maturity levels for each practice area as well as the relative riskiness of each practice area. The roadmap produced by the self-assessment is able to use this information to provide organizations with a prioritized list of practices for reaching their risk based maturity targets.

By understanding which practice areas pose the greatest risk to organizations and computer systems, individuals can make informed decisions regarding capability development and resource utilization.

In addition to the roadmap, the CCA can provide views for measuring cybersecurity capabilities. Practices can be tagged to relevant industry standards documents. As a result of these alignments, the CCA can provide industry standard views including the NIST Framework for Improving Critical Infrastructure Cybersecurity (The Cybersecurity Framework or CSF), ISO/IEC 27001 (Information technology-Security techniques—Information security management systems—Requirements), and ISO/IEC 27002 (Information technology—Security techniques—Code of practice for information security controls as well as CMMI's Threat Kill Cycle).

Each of these views can provide a lens through which an organization can see the alignment of the practices to the industry standards. These views provide a simple way to view both the practices that the organization has completed as well as the practices that the organization needs to implement in order to reach their risk-based maturity targets as they align to industry standards. By providing these reference points, organizations have the ability to report alignment to multiple standards through one evaluation.

Building resilience within an organization requires a thorough understanding of the capabilities that are critical for operating a business as well as a clear understanding of the risks to the enterprise. The self-assessment enables organizations to align enterprise risk to some of their capabilities to create standardized maturity targets that will empower them to build resilience within their organization and computer systems.

Focusing on actual risks to the organization and computer systems before compliance-based risk provides organizations with a realistic view of the capabilities that pose the greatest risk to their business. The CCA aids organizations in identifying these capabilities with the greatest risk and then aligns them to industry standards as a byproduct, ensuring that the requirements dictated by industry are implemented in a way that meets the needs of the computer system or the individual organization.

The present disclosure includes the methods discussed above, computing apparatuses configured to perform methods, and computer storage media storing instructions which when executed on the computing apparatuses causes the computing apparatuses to perform the methods.

The CCA, the user interface, the computer program, and any other technology disclosed herein can be implemented by computer software and/or computer hardware. For example, the CCA, the user interface, the computer program, and any other technology disclosed herein can be implemented in the data processing system illustrated in FIG. 8.

Figure 8:
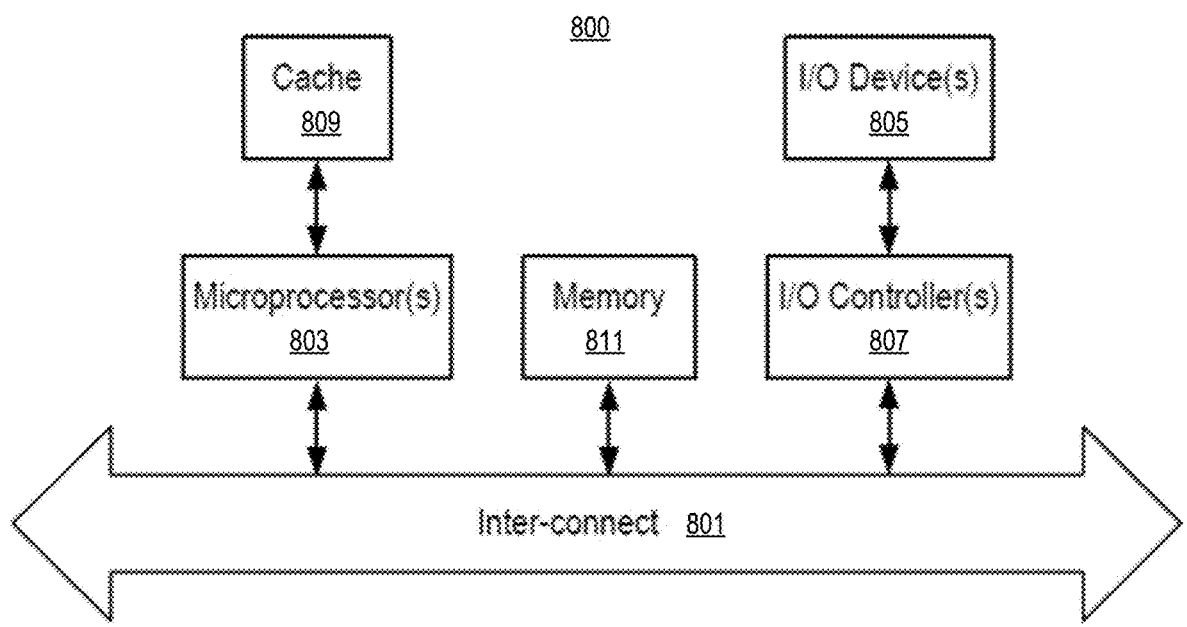
FIG. 8 shows a data processing system in which the methods of the present disclosure can be implemented, in accordance with some embodiments of the present disclosure.

Also, FIG. 8 shows a data processing system in which the methods of the present disclosure can be implemented.

While FIG. 8 illustrates various components of a computer system, it is not intended to represent any particular architecture or manner of interconnecting the components. Some embodiments can use other systems that have fewer or more components than those shown in FIG. 8.

In FIG. 8, the data processing system 800 includes an inter-connect 801 (e.g., bus and system core logic), which interconnects one or more microprocessors 803 and memory 811. The microprocessor 803 is coupled to cache memory 809 in the example of FIG. 8.

As shown, the inter-connect 801 interconnects the one or more microprocessors 803 and the memory 811 together and also interconnects them to input/output (I/O) device(s) 805 via I/O controller(s) 807. I/O devices 805 can include a display device and/or peripheral devices, such as mice, keyboards, modems, network interfaces, printers, scanners, video cameras and other devices known in the art. In some embodiments, when the data processing system is a server system, some of the I/O devices 805, such as printers, scanners, mice, and/or keyboards, are optional.

As shown, the inter-connect 801 includes one or more buses connected to one another through various bridges, controllers and/or adapters. In some embodiments, the I/O controllers 807 include a USB (Universal Serial Bus) adapter for controlling USB peripherals, and/or an IEEE-1394 bus adapter for controlling IEEE-1394 peripherals.

As shown, the memory 811 includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory can also be a random-access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine-readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by the data processing system.

FIGS. 9-12 are flow diagrams of methods 900, 1000, 1100, and 1200, respectively. Each of the methods 900, 1000, 1100, and 1200 are in accordance with some embodiments of the present disclosure. Each of the methods 900, 1000, 1100, and 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, each of the methods 900, 1000, 1100, and 1200 can be performed by one or more aspects of the data processing system 800. Although shown in a particular sequence or order, unless otherwise specified, the order of the processes in each of the methods can be modified. Thus, the illustrated embodiments should be understood only as examples, and the illustrated processes in each of the methods can be performed in a different order, and some processes can be performed in parallel. Additionally, one or more processes can be omitted in various embodiments. Thus, not all processes are required in every embodiment. Other process flows are possible as well.

FIG. 9 is a flow diagram of a method 900 that is in accordance with some embodiments of the present disclosure. The method 900 includes computing a maturity measurement for a computer system (e.g., a computing device or a computer network including at least a plurality of computing devices). The method 900 begins at process 902 with generating and outputting to an I/O device, a user interface including a plurality of user input fields for receiving the likelihood and/or impact of a plurality of pre-defined potential events related to a plurality of pre-defined potential vulnerabilities related to a computer system. The process 902 can be performed by one or more aspects of the data processing system 800.

In some embodiments, the generating and outputting the user interface includes generating a graphical user interface (GUI) having a matrix of the user input fields (such as the risk matrix illustrated in FIG. 3). The matrix cab be defined by the set of pre-defined potential vulnerabilities and the set of pre-defined potential events such that each field in the matrix is defined by a unique risk scenario having one of the pre-defined potential vulnerabilities and one of the pre-defined potential events. In such embodiments, the method can include outputting the GUI to a display device of the I/O device.

At process 904, the method 900 includes receiving, via the user interface, a risk profile including the likelihood and/or impact for each event of a selected group of events of the plurality of pre-defined potential events (e.g., see the risk profile and questionnaire shown in FIG. 4). The process 904 can be performed by one or more aspects of the data processing system 800. The likelihood and/or impact for each event of the selected group of events can be a separate element of the risk profile.

In some embodiments, the receiving of the likelihood and/or impact for each event of the selected group of events includes receiving both the likelihood and the impact for each event of the selected group of events. In such embodiments, each field of the plurality of user input fields can be defined by a unique risk scenario having one vulnerability of the plurality of pre-defined potential vulnerabilities and one event of the plurality of pre-defined potential events. Also, in general, in other embodiments each field of the plurality of user input fields also can be defined by a unique risk scenario having one vulnerability of the plurality of pre-defined potential vulnerabilities and one event of the plurality of pre-defined potential events.

At process 906, the method 900 includes computing a maturity measurement for the computer system using the risk profile and a database. The database includes information for a set of practices and relationships between practices the set of practices and events of the plurality of pre-defined potential events. The process 906 can be performed by one or more aspects of the data processing system 800. The process 906 can include process 1000 of FIG. 10. Also, the process 906 can include process 1100 of FIG. 11.

In some embodiments, each event of the selected group of events of the risk profile can be a unique risk scenario of one vulnerability of the plurality of pre-defined potential vulnerabilities. In such embodiments, the process 906 can include mapping certain practices of the set of practices to the unique risk scenarios of the risk profile according to the relationships between practices the set of practices and events of the plurality of pre-defined potential events in the database (e.g., see process 1002 of FIG. 10 or process 1102 of FIG. 11). Each mapped practice of the mapped certain practices can be associated with a predefined maturity level in the database (e.g., see process 1004 of FIG. 10 or process 1104 of FIG. 11), and the computing of the maturity measurement for the computer system can be based on at least the predefined maturity levels of the mapped certain practices (e.g., see process 1006 of FIG. 10 or process 1106 of FIG. 11). For example, the computing of the maturity measurement for the computer system can include summing or averaging the predefined maturity levels of the mapped certain practices such that the maturity measurement includes a summation or average of the predefined maturity levels of the mapped certain practices. Additionally, or alternatively, the computing of the maturity measurement for the computer system can include weighting each likelihood and/or impact for each event of the selected group of events with the predefined maturity level of the certain practice mapped to the event such that the maturity measurement is a weighted summation or a weighted average of likelihoods and/or impacts of the selected group of events.

The predefined maturity level for each practice of the set of practices can be one of five levels of maturity. The five levels of maturity can include an initial level of maturity (also referred to as "the performed level" or "performed"), a repeatable level of maturity (also referred to as "the managed level" or "managed"), a defined level of maturity (also referred to as "the defined level" or "defined"), a capable level of maturity (also referred to as "the quantitatively managed level" or "qualitatively managed"), and an efficient level of maturity (also referred to as "the optimized level" or "optimize"). These levels are described in more detail in the description of FIG. 12.

Figure 10:
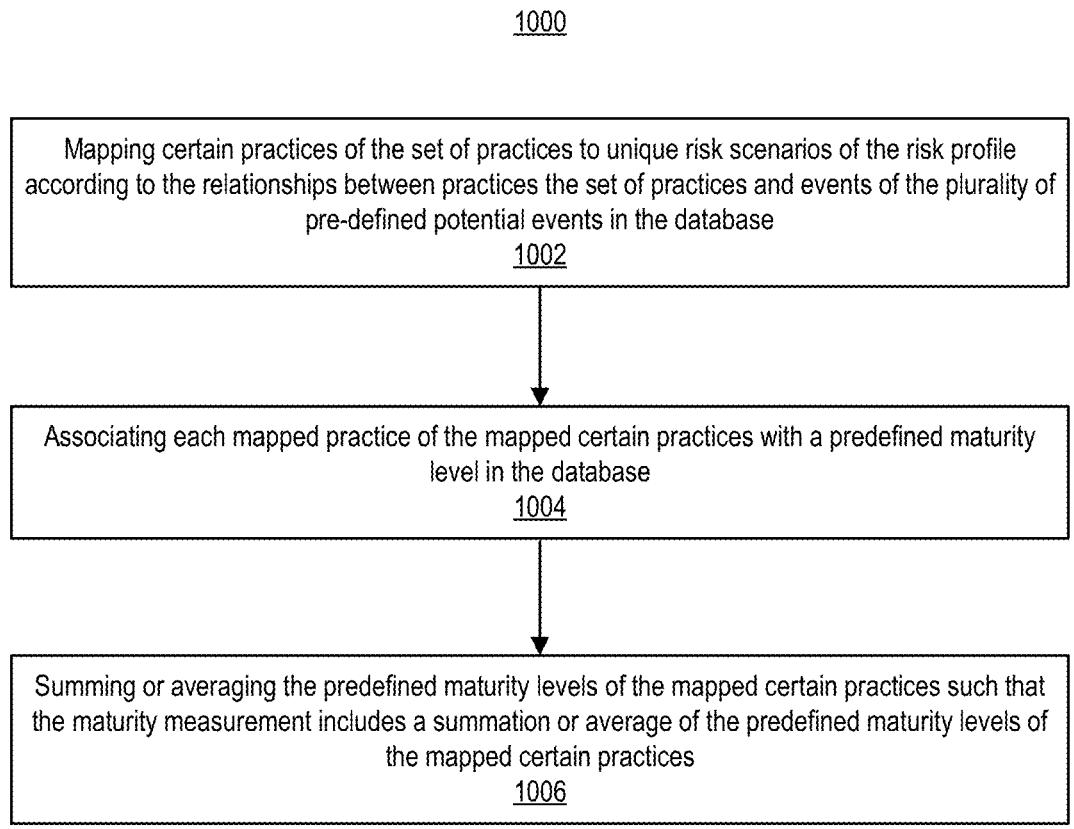
FIG. 10 is a flow diagram of a method for computing a maturity measurement for a computer system, in accordance with some embodiments of the present disclosure.

FIG. 10 is a flow diagram of method 1000 for computing a maturity measurement for a computer system, in accordance with some embodiments of the present disclosure. At process 1002 of method 1000, the method includes mapping certain practices of the set of practices to unique risk scenarios of the risk profile according to the relationships between practices the set of practices and events of the plurality of pre-defined potential events in the database. At process 1004, the method 1000 includes associating each mapped practice of the mapped certain practices with a predefined maturity level in the database. At process 1006, the method 1000 includes summing or averaging the pre-defined maturity levels of the mapped certain practices such that the maturity measurement includes a summation or average of the predefined maturity levels of the mapped certain practices. The processes 1002, 1004, and 1006 can each be performed by one or more aspects of the data processing system 800.

FIG. 11 is a flow diagram of method 1100 for computing a maturity measurement for a computer system, in accordance with some embodiments of the present disclosure. At process 1102 of method 1100, the method includes mapping certain practices of the set of practices to unique risk scenarios of the risk profile according to the relationships between practices the set of practices and events of the plurality of pre-defined potential events in the database. At process 1104, the method 1000 includes associating each mapped practice of the mapped certain practices with a predefined maturity level in the database. At process 1106, the method 1000 includes weighting each likelihood and/or impact for each event of the selected group of events with the predefined maturity level of the certain practice mapped to the event such that the maturity measurement is a weighted summation or a weighted average of likelihoods and/or impacts of the selected group of events. At process 1108, the method 1000 includes performing a weighted summation or a weighted average of the likelihoods and/or impacts of the selected group of events to calculate the maturity measurement. The processes 1102, 1104, 1106, and 1108 can each be performed by one or more aspects of the data processing system 800.

Figure 12:
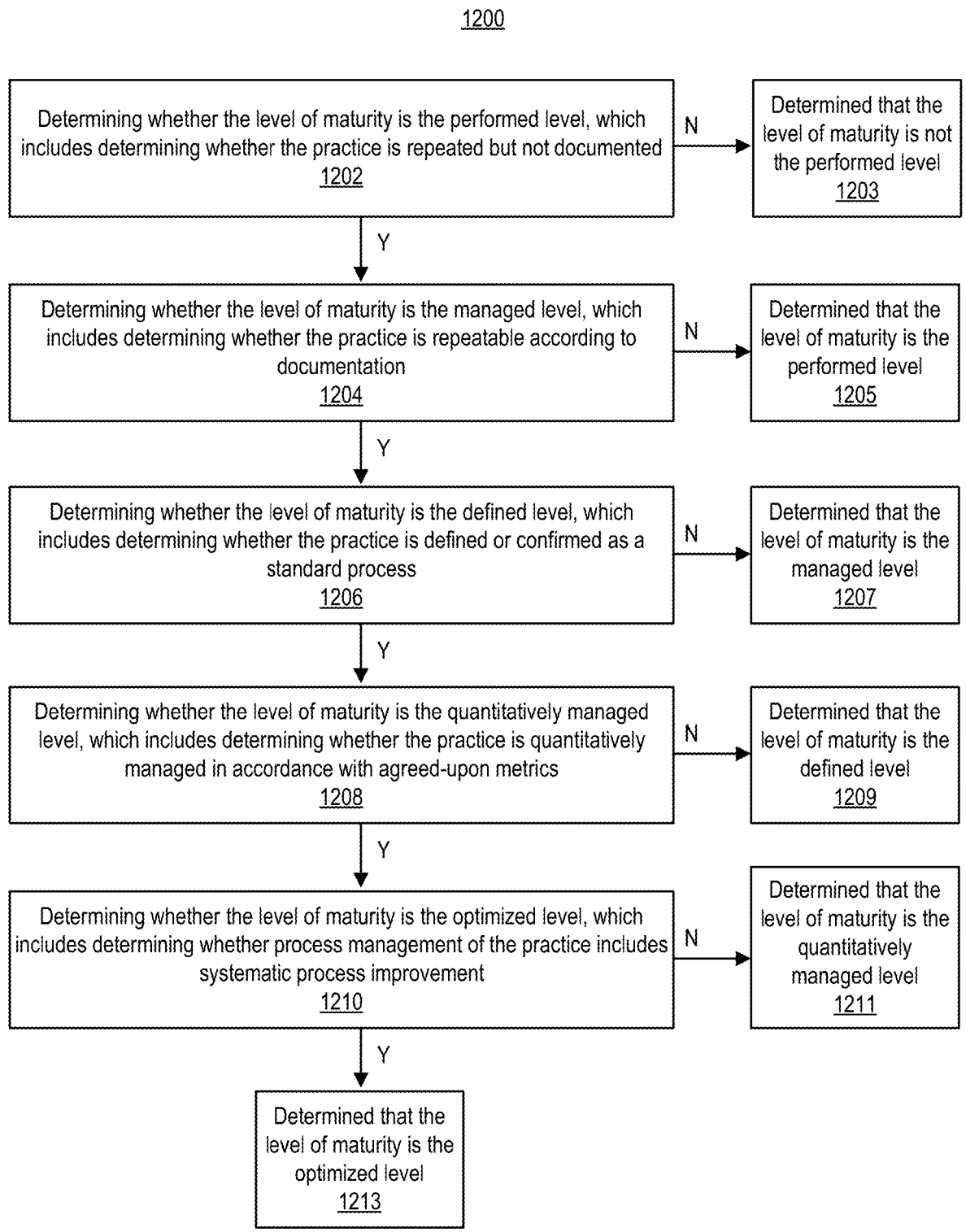
FIG. 12 is a flow diagram of a method for determining a level of maturity for a practice, in accordance with some embodiments of the present disclosure.

FIG. 12 is a flow diagram of method 1200 that is for determining a level of maturity for a practice, in accordance with some embodiments of the present disclosure. A level of the levels of maturity described in the description of FIG. 12 can be a predefined maturity level of a practice of the set of practices described in the description of FIGS. 10 and 11. For example, the predefined maturity level for each practice of the set of practices described in FIGS. 10 and 11 can be one of five levels of maturity, and the five levels of maturity can include an initial level of maturity ("performed level"), a repeatable level of maturity ("the managed level"), a defined level of maturity ("the defined level"), a capable level of maturity ("the quantitatively managed level"), and an efficient level of maturity ("the optimized level"). Also, the determining a level of maturity for each practice of the set of practices described with respect to FIGS. 10 and 11 can include one or more of the processes illustrated in FIG. 12. And, the processes of method 1200 of FIG. 12 can each be performed by one or more aspects of the data processing system 800.

At process 1202 of method 1200, the method begins with determining whether the level of maturity for a practice is the performed level, which includes determining whether the practice is repeated but not documented. At block 1203, it has been determined that the level of maturity is not the performed level. If it has been determined that the level of maturity is the performed level, then the method can move on to one of the other processes of method 1200. For example, the method moves on to process 1204.

At process 1204, the method 1200 includes determining whether the level of maturity for a practice is the managed level, which includes determining whether the practice is repeatable according to documentation. At block 1205, it has been determined that the level of maturity is merely at the performed level, because it has been determined that the level of maturity is not at the managed level. If it has been determined that the level of maturity is the managed level, then the method can move on to process 1206, 1208, 1210, or 1212. In one example, the method moves on to process 1206. In general, if the level of the practice meets the requirements for the managed level, then it also meets the requirements for the performed level.

At process 1206, the method 1200 includes determining whether the level of maturity for a practice is the defined level, which includes determining whether the practice is defined or confirmed as a standard process. At block 1207, it has been determined that the level of maturity is merely at the managed level, because it has been determined that the level of maturity is not at the defined level. If it has been determined that the level of maturity is the defined level, then the method can move on to process 1208 or 1210. In one example, the method moves on to process 1208. In general, if the level of the practice meets the requirements for the defined level, then it also meets the requirements for the managed level.

At process 1208, the method 1200 includes determining whether the level of maturity for a practice is the quantitatively managed level, which includes determining whether the practice is quantitatively managed in accordance with agreed-upon metrics. At block 1209, it has been determined that the level of maturity is merely at the defined level, because it has been determined that the level of maturity is not at the quantitatively managed level. If it has been determined that the level of maturity is the quantitatively managed level, then the method can move on to process 1210. In general, if the level of the practice meets the requirements for the quantitatively managed level, then it also meets the requirements for the defined level.

At process 1210, the method 1200 includes determining whether the level of maturity for a practice is the optimized level, which includes determining whether process management of the practice includes systematic process improvement. At block 1211, it has been determined that the level of maturity is merely at the quantitatively managed level, because it has been determined that the level of maturity is not at the optimized level. At block 1213, it has been determined that the level of maturity is the optimized level. In general, if the level of the practice meets the requirements for the optimized level, then it also meets the requirements for the quantitatively managed level.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which can be exhibited by one embodiment and not by others. Similarly, various requirements are described which can be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, can limit the options of excluding selected features from the implementation, and incompatibility of certain features with other features, as apparent from the description, can limit the options of including selected features together in the implementation.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computer implemented method comprising:
   mapping, using one or more microprocessors, practices to unique risk scenarios of a risk profile according to relationships between the practices and events of a plurality of pre-defined potential events in a database;
   associating, using the one or more microprocessors, the mapped practices with a predefined maturity level in the database;
     wherein associating the mapped practices with the predefined maturity level in the database comprises determining whether the predefined maturity level is a performed level, which comprises determining whether the mapped practice is repeated but not documented; and
   calculating, using the one or more microprocessors, a maturity measurement, wherein the calculating includes summing or averaging the predefined maturity levels of the mapped practices.

2. The computer implemented method of claim 1, wherein the calculating, using the one or more microprocessors, the maturity measurement comprises summing the predefined maturity levels of the mapped practices such that the maturity measurement comprises a summation of the predefined maturity levels of the mapped practices.

3. The computer implemented method of claim 1, wherein the calculating, using the one or more microprocessors, the maturity measurement comprises averaging the predefined maturity levels of the mapped practices such that the maturity measurement comprises an average of the predefined maturity levels of the mapped practices.

4. The computer implemented method of claim 1, comprising weighting, using the one or more microprocessors, each likelihood and/or impact for each event of a selected group of events with the predefined maturity level of the mapped practice to the event such that the maturity measurement is a weighted summation or a weighted average of likelihoods and/or impacts of the selected group of events.

5. The computer implemented method of claim 1, wherein associating, using the one or more microprocessors, the mapped practices with the predefined maturity level in the database comprises determining whether the predefined maturity level is a managed level, which comprises determining whether the mapped practice is repeatable according to documentation.

6. The computer implemented method of claim 1, wherein associating, using the one or more microprocessors, the mapped practices with the predefined maturity level in the database comprises determining whether the predefined maturity level is a defined level, which comprises determining whether the mapped practice is defined or confirmed as a standard process.

7. The computer implemented method of claim 1, wherein associating, using the one or more microprocessors, the mapped practices with the predefined maturity level in the database comprises determining whether the predefined maturity level is a quantitatively managed level, which comprises determining whether the mapped practice is quantitatively managed in accordance with agreed-upon metrics.

8. The computer implemented method of claim 1, wherein associating, using the one or more microprocessors, the mapped practices with the predefined maturity level in the database comprises determining whether the predefined maturity level is an optimized level, which comprises determining whether process management of the mapped practice includes systematic process improvement.

9. A non-transitory computer-readable storage medium comprising instructions that, when executed by a processing device, cause the processing device to:
mapping, using one or more microprocessors, practices to unique risk scenarios of a risk profile according to relationships between the practices and events of a plurality of pre-defined potential events in a database;
associating, using the one or more microprocessors, the mapped practices with a predefined maturity level in the database;
wherein associating the mapped practices with the predefined maturity level in the database comprises determining whether the predefined maturity level is a performed level, which comprises determining whether the mapped practice is repeated but not documented; and
calculating, using the one or more microprocessors, a maturity measurement, wherein the calculating includes summing or averaging the predefined maturity levels of the mapped practices.

10. The non-transitory computer-readable storage medium of claim 9, wherein the calculating, using the one or more microprocessors, the maturity measurement comprises summing the predefined maturity levels of the mapped practices such that the maturity measurement comprises a summation of the predefined maturity levels of the mapped practices.

11. The non-transitory computer-readable storage medium of claim 9, wherein the calculating, using the one or more microprocessors, the maturity measurement comprises averaging the predefined maturity levels of the mapped practices such that the maturity measurement comprises an average of the predefined maturity levels of the mapped practices.

12. The non-transitory computer-readable storage medium of claim 9, comprising weighting, using the one or more microprocessors, each likelihood and/or impact for each event of a selected group of events with the predefined maturity level of the mapped practice to the event such that the maturity measurement is a weighted summation or a weighted average of likelihoods and/or impacts of the selected group of events.

13. The non-transitory computer-readable storage medium of claim 9, wherein associating, using the one or more microprocessors, the mapped practices with the predefined maturity level in the database comprises determining whether the predefined maturity level is a managed level, which comprises determining whether the mapped practice is repeatable according to documentation.

14. The non-transitory computer-readable storage medium of claim 9, wherein associating, using the one or more microprocessors, the mapped practices with the predefined maturity level in the database comprises determining whether the predefined maturity level is a defined level, which comprises determining whether the mapped practice is defined or confirmed as a standard process.

15. The non-transitory computer-readable storage medium of claim 9, wherein associating, using the one or more microprocessors, the mapped practices with the predefined maturity level in the database comprises determining whether the predefined maturity level is a quantitatively managed level, which comprises determining whether the mapped practice is quantitatively managed in accordance with agreed-upon metrics.

16. The non-transitory computer-readable storage medium of claim 9, wherein associating, using the one or more microprocessors, the mapped practices with the predefined maturity level in the database comprises determining whether the predefined maturity level is an optimized level, which comprises determining whether process management of the mapped practice includes systematic process improvement.

17. A system comprising:
a processing device; and
memory in communication with the processing device and storing instructions that, when executed by the processing device, cause the processing device to:
map practices to unique risk scenarios of a risk profile according to relationships between the practices and events of a plurality of pre-defined potential events in a database;
associate the mapped practices with a predefined maturity level in the database;
wherein associating the mapped practices with the predefined maturity level in the database comprises determining whether the predefined maturity level is a performed level, which comprises determining whether the mapped practice is repeated but not documented; and
calculate a maturity measurement, wherein the calculating includes summing or averaging the predefined maturity levels of the mapped practices.

18. The system of claim 17, wherein the calculating the maturity measurement comprises summing the predefined maturity levels of the mapped practices such that the maturity measurement comprises a summation of the predefined maturity levels of the mapped practices.

\* \* \* \* \*